(12) United States Patent
Lee et al.

(10) Patent No.: US 10,547,249 B2
(45) Date of Patent: Jan. 28, 2020

(54) BRIDGE CIRCUIT AND RECTIFIER INCLUDING THE SAME

(71) Applicant: Samsung Electro-Mechanics Co., Ltd., Suwon-si (KR)

(72) Inventors: Youn Joong Lee, Suwon-si (KR); Koon Shik Cho, Suwon-si (KR); Ho Kwon Yoon, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 67 days.

(21) Appl. No.: 15/708,775

(22) Filed: Sep. 19, 2017

(65) Prior Publication Data
US 2018/0123473 A1 May 3, 2018

(30) Foreign Application Priority Data

Oct. 28, 2016 (KR) .................. 10-2016-0141702
Feb. 27, 2017 (KR) .................. 10-2017-0025414

(51) Int. Cl.
*H02M 7/219* (2006.01)
*H02M 1/08* (2006.01)
*H02M 1/088* (2006.01)
*H02M 1/00* (2006.01)

(52) U.S. Cl.
CPC ............ *H02M 7/219* (2013.01); *H02M 1/08* (2013.01); *H02M 1/088* (2013.01); *H02M 2001/0048* (2013.01); *Y02B 70/1491* (2013.01)

(58) Field of Classification Search
CPC . H02M 2001/0048; H02M 2001/0029; H02M 2001/0058; H02M 1/08; H02M 1/088; H02M 7/21; H02M 7/217; H02M 7/219; H02M 7/12; H02M 7/125; H02M 7/155; H02M 7/1555; H02M 7/162; H02M 7/1623
See application file for complete search history.

(56) References Cited

U.S. PATENT DOCUMENTS

| | | | | |
|---|---|---|---|---|
| 9,467,057 | B2 * | 10/2016 | Fu .................... | H02M 3/33546 |
| 2010/0073979 | A1 * | 3/2010 | Wang ................... | H02M 7/155 363/127 |
| 2011/0199061 | A1 * | 8/2011 | Shimada ............... | G05F 1/445 323/237 |
| 2015/0043260 | A1 * | 2/2015 | Liu .................... | H01L 27/0629 363/127 |

(Continued)

FOREIGN PATENT DOCUMENTS

| KR | 2000-0008304 A | 2/2000 |
|---|---|---|
| KR | 10-1385979 B1 | 4/2014 |

*Primary Examiner* — Yusef A Ahmed
*Assistant Examiner* — Shahzeb K Ahmad
(74) *Attorney, Agent, or Firm* — NSIP Law

(57) ABSTRACT

A bridge circuit includes: a first leg including a first switching device and a second switching device connected between a first node and a ground; a second leg including a third switching device and a fourth switching device connected between the first node and the ground; and a first charge recycler connected between a gate of the first switching device and a gate of the third switching device, and configured to transfer charges accumulated in the first switching device to the gate of the third switching device prior to turning on the third switching device.

18 Claims, 8 Drawing Sheets

(56) References Cited

U.S. PATENT DOCUMENTS

| | | | |
|---|---|---|---|
| 2016/0043657 A1* | 2/2016 | Mauder | H02M 7/217 |
| | | | 363/127 |
| 2017/0019095 A1* | 1/2017 | Leong | H03K 17/167 |
| 2018/0097451 A1* | 4/2018 | Morin | H02M 7/219 |
| 2018/0212506 A1* | 7/2018 | Kress | H02M 1/08 |
| 2018/0331613 A1* | 11/2018 | Kondo | H02M 1/08 |

* cited by examiner

BRIDGE CIRCUIT AND RECTIFIER INCLUDING THE SAME

CROSS-REFERENCE TO RELATED APPLICATIONS

This application claims the benefit under 35 U.S.C. § 119(a) of Korean Patent Application No. 10-2016-0141702, filed on Oct. 28, 2016, and Korean Patent Application No. 10-2017-0025414, filed on Feb. 27, 2017, in the Korean Intellectual Property Office, the entire disclosures of which are incorporated herein by reference for all purposes.

BACKGROUND

1. Field

The following description relates to a bridge circuit including switching devices complementarily (e.g., in combination) turned on or off, and a rectifier including such a bridge circuit.

2. Description of Related Art

Bridge circuits each including switching devices complementarily turned on or off are used, in various ways, as inverters converting direct current (DC) power into alternating current (AC) power and rectifiers converting AC power into DC power. Furthermore, inverters or rectifiers are common in power transmission fields or the like.

Efforts to reduce power consumption in the control of inverters or rectifiers are ongoing.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a bridge circuit includes: a first leg including a first switching device and a second switching device connected between a first node and a ground; a second leg including a third switching device and a fourth switching device connected between the first node and the ground; and a first charge recycler connected between a gate of the first switching device and a gate of the third switching device, and configured to transfer charges accumulated in the first switching device to the gate of the third switching device prior to turning on the third switching device.

The first charge recycler may include a first charge transfer switching device connected between the gate of the first switching device and a third node, a second charge transfer switching device connected between the gate of the third switching device and the third node, and a capacitor connected between the third node and the ground.

The bridge circuit may further include a second charge recycler connected between a gate of the second switching device and a gate of the fourth switching device, and configured to transfer charges accumulated in the second switching device to the gate of the fourth switching device prior to turning on the fourth switching device.

In another general aspect, a rectifier includes: a bridge circuit including: a first leg including a first switching device and a second switching device connected between an output node for outputting a rectified voltage and a ground, a second leg including a third switching device and a fourth switching device connected between the output node and the ground, and a first charge recycler connected between a gate of the first switching device and a gate of the third switching device, and configured to transfer charges accumulated in the first switching device to the gate of the third switching device prior to turning on the third switching device; and a controller configured to control the first switching device, the second switching device, the third switching device, the fourth switching device, and the first charge recycler.

The first switching device may be connected between the output node and a first node. The second switching device may be connected between the first node and the ground. The third switching device may be connected between the output node and a second node. The fourth switching device is connected between the second node and the ground. An alternating current (AC) voltage may be input to the first node and the second node. The rectifier may further include a second charge recycler connected between a gate of the second switching device and a gate of the fourth switching device, and configured to transfer charges accumulated in the second switching device to the gate of the fourth switching device prior to turning on the fourth switching device.

The first charge recycler may include: a first charge transfer switching device connected between the gate of the first switching device and a third node; a first capacitor connected between the third node and the ground; and a third charge transfer switching device connected between the third node and the gate of the third switching device. The second charge recycler may include a second charge transfer switching device connected between the gate of the second switching device and a fourth node, a second capacitor connected between the fourth node and the ground, and a fourth charge transfer switching device connected between the fourth node and the gate of the fourth switching device.

The controller may be configured to control the second switching device, the third switching device, the second charge transfer switching device, and the third charge transfer switching device, based on a first current flowing to the first node, and to control the first switching device, the fourth switching device, the first charge transfer switching device, and the fourth charge transfer switching device, based on a second current flowing to the second node.

The controller may include a first controller configured to output a second control signal and a third control signal, based on a determination of whether a magnitude of the first current is 0 or higher, and to output a first control signal and a fourth control signal, based on a determination of whether a magnitude of the second current is 0 or higher. The controller may further include a first control signal generator configured to output a first charge recycling control signal controlling the first charge transfer switching device in response to the first control signal, a second control signal generator configured to output a second charge recycling control signal controlling the second charge transfer switching device in response to the second control signal, a third control signal generator configured to output a third charge recycling control signal controlling the third charge transfer switching device in response to the third control signal, and a fourth control signal generator configured to output a fourth charge recycling control signal controlling the fourth charge transfer switching device in response to the fourth control signal.

The first control signal generator may include a first delay configured to delay the first control signal so as to output a first delayed control signal, and a first gate device configured to receive the first control signal and the first delayed control signal so as to output the first charge recycling control signal.

The rectifier may further include an auxiliary switching device connected between the first delay and the first switching device. The first control signal generator may include a latch configured to receive the first charge recycling control signal from a set input terminal, a second delay configured to delay an output signal of the latch so as to output the delayed output signal to a reset input terminal of the latch, and a second gate device configured to receive the first charge recycling control signal and the output signal of the latch so as to output an auxiliary switch control signal controlling the auxiliary switching device.

The controller may be configured to turn the second charge transfer switching device on for a first period of time from either one of a time at which a magnitude of the first current is determined to be higher than 0 and a time at which the magnitude of the first current is 0, and to turn the fourth charge transfer switching devices on for a second period of time from either one of a time at which a magnitude of the second current is higher than 0 and a time at which the magnitude of the second current is 0.

The first period of time may be greater than or equal to a value obtained by multiplying a value, obtained by multiplying total capacitance, measured from the gate of the second switching device, by on-resistance of the second charge transfer switching device, by 2.2. The second period of time may be greater than or equal to a value obtained by multiplying a value, obtained by multiplying total capacitance, measured from the gate of the fourth switching device, by on-resistance of the fourth charge transfer switching device, by 2.2.

The controller may be further configured to output a second delayed control signal obtained by delaying a second control signal, being in a first state, for the first period of time while a magnitude of the first current is 0 or higher, and to output a fourth delayed control signal obtained by delaying a fourth control signal, being in the first state, for the second period of time while a magnitude of the second current is 0 or higher. The rectifier may further include a second auxiliary switching device configured to transmit the second delayed control signal to the gate of the second switching device, and a fourth auxiliary switching device configured to transmit the fourth delayed control signal to the gate of the fourth switching device.

The controller may be configured to turn the second auxiliary switching device on for a third period of time after turning off the second charge transfer switching device, and to turn the fourth auxiliary switching device on for a fourth period of time after turning off the fourth charge transfer switching device.

The third period of time may be greater than or equal to a value obtained by multiplying a value, obtained by multiplying total capacitance, measured from the gate of the second switching device, by on-resistance of the second auxiliary switching device, by 2.2. The fourth period of time may be greater than or equal to a value obtained by multiplying a value, obtained by multiplying total capacitance, measured from the gate of the fourth switching device, by on-resistance of the fourth auxiliary switching device, by 2.2.

In another general aspect, a rectifier includes: a bridge circuit configured to receive an alternating current (AC) input voltage and output a rectified voltage, and including a first switching transistor and a fourth switching transistor configured to be turned on or off together based on the AC input voltage, a second switching transistor and a third switching transistor configured to be turned on or off together based on the AC input voltage, a first charge recycler configured to transfer charges accumulated in the first switching transistor to a gate of the third switching transistor prior to turning on the third switching transistor, and a second charge recycler configured to transfer charges accumulated in the second switching transistor to a gate of the fourth switching transistor prior to turning on the fourth switching transistor; and a controller configured to control the bridge circuit.

The first charge recycler may include first and third charge transfer switching transistors connected between a gate of the first switching transistor and the gate of the third switching transistor, and a first capacitor connected to a ground and a node between the first and third charge transfer switching transistors. The second charge recycler may include second and fourth charge transfer switching transistors connected between a gate of the second switching transistor and the gate of the fourth switching transistor, and a second capacitor connected between the ground and a node between the second and fourth charge transfer switching transistors.

The controller may be further configured to control the second switching transistor, the third switching transistor, the second charge transfer switching transistor, and the third charge transfer switching transistor, based on a first current flowing to a node between the first switching transistor and the third switching transistor. The controller may be further configured to control the first switching transistor, the fourth switching transistor, the first charge transfer switching transistor, and the fourth charge transfer switching transistor, based on a second current flowing to a node between the second switching transistor and the fourth switching transistor.

The AC input voltage may be input to the first node and the second node.

In another general aspect, a bridge circuit includes: a first switching transistor disposed on a first leg of the bridge circuit; a second switching transistor disposed on the first leg; a third switching transistor disposed on a second leg of the bridge circuit; a fourth switching transistor disposed on the second leg; and a first charge recycler configured to transfer charges accumulated in the first switching transistor to the third switching transistor prior to turning on the third switching transistor.

The first switching transistor and the third switching transistor may be configured to be turned on or off alternately with respect to each other.

The first switching transistor and the fourth switching transistor may be configured to be turned on or off together.

The first charge recycler may include a capacitor configured to store the charges, and charge transfer switching transistors configured to transfer the charges.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative sizes, proportions, and depictions of elements in the drawings may be exaggerated for clarity, illustration, and convenience.

DETAILED DESCRIPTION

Figure 1:
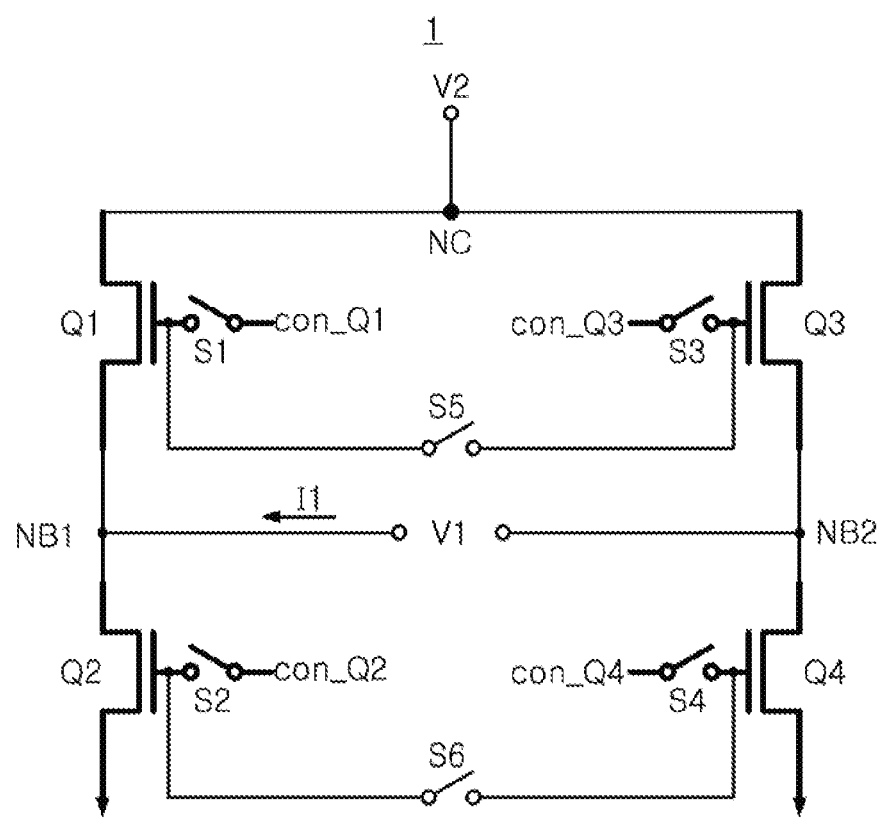
FIG. 1 is a schematic circuit diagram illustrating a configuration of a bridge circuit, according to an example.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when an element, such as a layer, region, or substrate, is described as being "connected to" or "coupled to" another element, it may be directly "connected to" or "coupled to" the other element, or there may be one or more other elements intervening therebetween. In contrast, when an element is described as being "directly connected to" or "directly coupled to" another element, there can be no other elements intervening therebetween.

As used herein, the term "and/or" includes any one and any combination of any two or more of the associated listed items.

Although terms such as "first," "second," and "third" may be used herein to describe various members or components, these members or components are not to be limited by these terms. Rather, these terms are only used to distinguish one member or component from another member or component. Thus, a first member or component referred to in examples described herein may also be referred to as a second member or component without departing from the teachings of the examples.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

The features of the examples described herein may be combined in various ways as will be apparent after an understanding of the disclosure of this application. Further, although the examples described herein have a variety of configurations, other configurations are possible as will be apparent after an understanding of the disclosure of this application.

FIG. 1 is a schematic circuit diagram illustrating a configuration of a bridge circuit 1, according to an example. The bridge circuit 1 includes first to fourth switching devices (e.g., transistors) Q1 to Q4, first to fourth auxiliary switching devices (e.g., transistors) S1 to S4, and a charge recycler including first and second charge transfer switching devices S5 and S6.

The first switching device Q1 is connected between a common node NC and a first bridge node NB1. The second switching device Q2 is connected between the first bridge node NB1 and a ground node. The third switching device Q3 is connected between the common node NC and a second bridge node NB2, and the fourth switching device Q4 is connected between the second bridge node NB2 and the ground node. The first switching device Q1 and the second switching device Q2 form a first leg, and the third switching device Q3 and the fourth switching device Q4 form a second leg.

The first switching device Q1 and the fourth switching device Q4 are turned on or off simultaneously. The second switching device Q2 and the third switching device Q3 are turned on or off simultaneously. Further, the first switching device Q1 and the second switching device Q2 are alternately turned on or off, and the third switching device Q3 and the fourth switching device Q4 are alternately turned on or off. Further, the first switching device Q1 and the third switching device Q3 are alternately turned on or off, and the second switching device Q2 and the fourth switching device Q4 are alternately turned on or off. Each of the first to fourth switching devices Q1 to Q4 is properly controlled depending on the use of the bridge circuit 1.

For example, when the bridge circuit 1 operates as a rectifier, each of the first to fourth switching devices Q1 to Q4 is controlled to be turned on or off in response to a first voltage V1, which is a voltage between the first bridge node NB1 and the second bridge node NB2, or in response to a first current I1 input through the first bridge node NB1. When the bridge circuit 1 operates as the rectifier, alternating current (AC) power is input to the first bridge node NB1 and the second bridge node NB2, and direct current (DC) power having a second voltage V2 is output from the common node NC.

Alternatively, when the bridge circuit 1 operates as an inverter, each of the first to fourth switching devices Q1 to Q4 is controlled to be turned on or off according to an operating frequency of the inverter. When the bridge circuit 1 operates as the inverter, DC power having the second voltage V2 is input to the common node NC, and AC power is output from the first bridge node NB1 and the second bridge node NB2.

The first auxiliary switching device S1 is connected between a gate terminal of the first switching device Q1 and a terminal to which a first control signal con_Q1 controlling the first switching device Q1 is applied. The second auxiliary switching device S2 is connected between a gate terminal of the second switching device Q2 and a terminal to which a second control signal con_Q2 controlling the second switching device Q2 is applied. The third auxiliary switching device S3 is connected between a gate terminal of the third switching device Q3 and a terminal to which a third control signal con_Q3 controlling the third switching device Q3 is applied. The fourth auxiliary switching device S4 is connected between a gate terminal of the fourth switching device Q4 and a terminal to which a fourth control signal con_Q4 controlling the fourth switching device Q4 is applied. Each of the first to fourth auxiliary switching devices S1 to S4 is turned off for a predetermined period of time immediately before each of the first to fourth switching devices Q1 to Q4 is turned off.

Each of the first to fourth auxiliary switching devices S1 to S4 functions to transmit a corresponding control signal to a gate of a corresponding one of the switching devices Q1 to Q4.

The charge recycler functions to transfer charges between the first or second switching device Q1 or Q2 of the first leg and the third or fourth switching device Q3 or Q4 of the second leg that are alternately turned on or off. The charge recycler includes a first charge recycler that recycles charges between the first switching device Q1 of the first leg and the third switching device Q3 of the second leg, and a second charge recycler that recycles charges between the second switching device Q2 of the first leg and the fourth switching device Q4 of the second leg. The first charge recycler includes the first charge transfer switching device S5, which is connected between the gate terminal of the first switching device Q1 and the gate terminal of the third switching device Q3, and the second charge recycler includes the second charge transfer switching device S6, which is connected between the gate terminal of the second switching device Q2 and the gate terminal of the fourth switching device Q4.

The first charge transfer switching device S5 is turned on for a predetermined period of time prior to turning on the first switching device Q1 and the third switching device Q3. The second charge transfer switching device S6 is turned on for a predetermined period of time prior to turning on the second switching device Q2 and the fourth switching device Q4. More specifically, the first charge transfer switching device S5 is turned on for a predetermined period of time prior to an operation turning on the first switching device Q1 and turning off the third switching device Q3, and is turned on for a predetermined period of time prior to an operation turning off the first switching device Q1 and turning on the third switching device Q3. The second charge transfer switching device S6 is turned on for a predetermined period of time prior to an operation of turning on the second switching device Q2 and turning off the fourth switching device Q4, and is turned on for a predetermined period of time prior to an operation turning off the second switching device Q2 and turning on the fourth switching device Q4.

Although not illustrated, the bridge circuit 1 further includes a controller that controls each of the first to fourth switching devices Q1 to Q4, the first to fourth auxiliary switching devices S1 to S4, the first and second charge transfer switching devices S5 and S6. The controller includes, for example, at least one driver circuit that outputs a control signal.

Further, FIG. 1 illustrates the charge recycler including both the first charge transfer switching device S5 and the second charge transfer switching device S6, but either the first charge transfer switching device S5 or the second charge transfer switching device S6 may also be removed. Further, one or more of the first to fourth auxiliary switching devices S1 to S4 are also removed in some examples.

Figure 2:
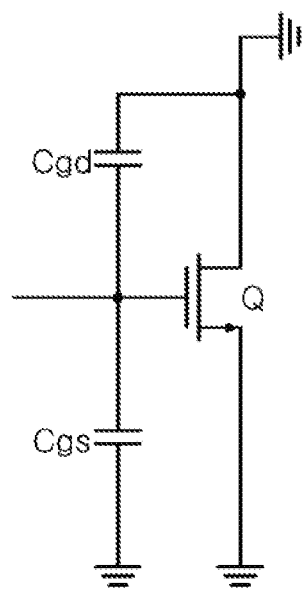
FIG. 2 is a schematic circuit diagram illustrating a switching device of a bridge circuit, according to an example.

FIG. 2 is a schematic circuit diagram illustrating a switching device Q of a bridge circuit, according to an example. Each of the first to fourth switching devices Q1 to Q4 of the bridge circuit, illustrated in FIG. 1, has a shape similar to that of a switching device Q illustrated in FIG. 2.

As illustrated in FIG. 2, each of the first to fourth switching devices Q1 to Q4 of the bridge circuit includes parasitic capacitors $C_{gd}$ and $C_{gs}$.

On-resistance of each of the first to fourth switching devices Q1 to Q4 of the bridge circuit is designed to have a sufficiently low level, for example, tens to hundreds of mohms, in order to reduce conduction loss. For example, each of the first to fourth switching devices Q1 to Q4 may be implemented to have a sufficient large size in order to reduce conduction loss. However, if switching devices are implemented to have a large size, capacitance of the parasitic capacitors $C_{gd}$ and $C_{gs}$ (FIG. 2) of the switching devices is also increased. When the capacitance of the parasitic capacitors $C_{gd}$ and $C_{gs}$ of FIG. 2 is increased, power consumption of a driver driving the switching devices, for example, switching loss, is also increased.

According to an example, charge transfer switching devices (for example, the first charge transfer switching device S5 and/or the second charge transfer switching device S6 of FIG. 1) are disposed between gate terminals of switching devices (for example, the first switching device Q1 and the third switching device Q3 and/or the second switching device Q2 and the fourth switching device Q4) of the bridge circuit complementarily turned on or off, and each of the charge transfer switching devices is turned on for a predetermined period of time immediately before a switching device connected thereto is turned off. Thus, charges accumulated in parasitic capacitors of a switching device being turned on are transferred to parasitic capacitors of a switching device to be turned on. For example, energy accumulated in the parasitic capacitors of the switching device being turned on are reused to drive the switching device to be turned on, thus reducing switching loss. Further, the switching device may be designed to have a sufficiently large size to thus reduce conduction loss.

Figure 3:
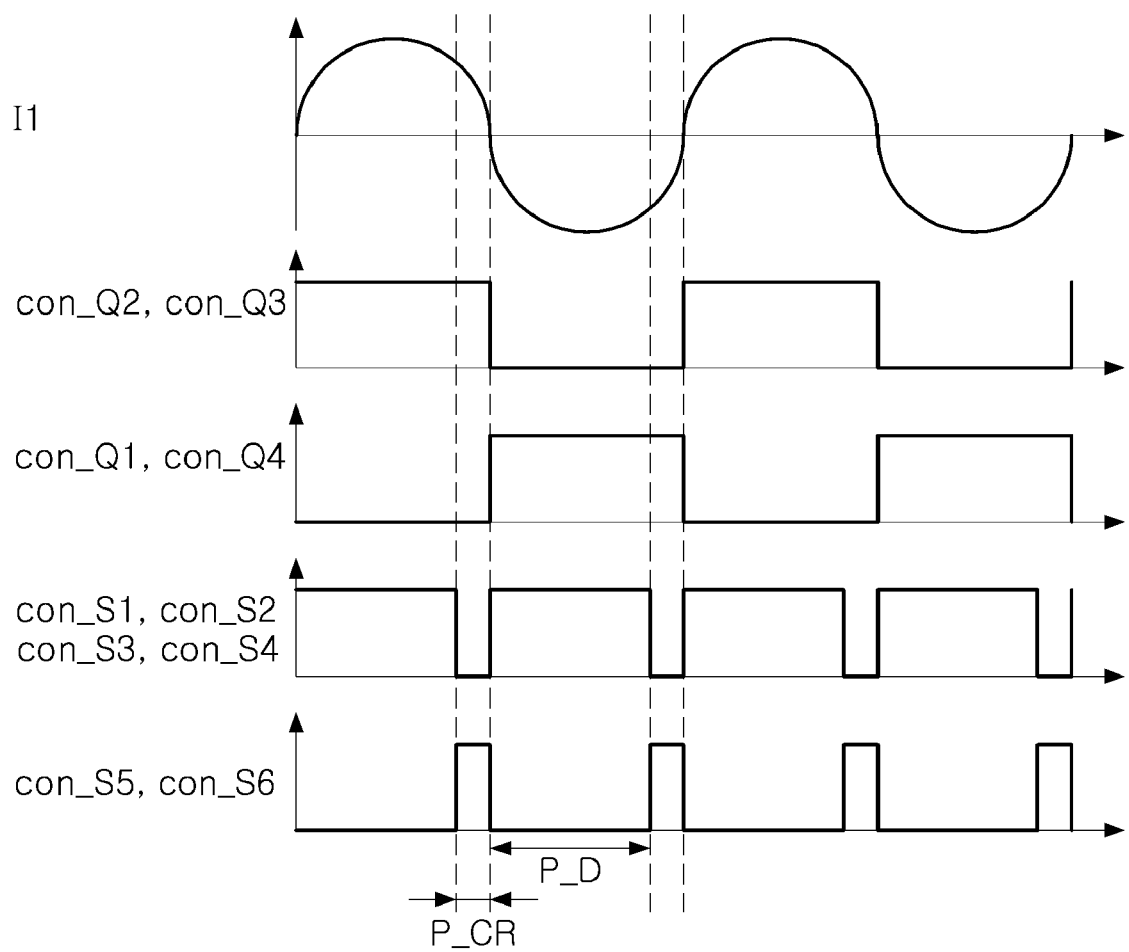
FIG. 3 is a schematic diagram illustrating examples of control signals controlling respective switching devices of a bridge circuit, according to an example.

FIG. 3 is a schematic diagram illustrating examples of control signals controlling respective switching devices of a bridge circuit, and illustrate a case in which the bridge circuit operates as a rectifier, but performs a zero current switching operation. As illustrated in FIG. 3, con_Q1, con_Q2, con_Q3, and con_Q4 are control signals controlling the first to fourth switching devices Q1 to Q4 of FIG. 1, respectively; con_S1, con_S2, con_S3, and con_S4 are control signals controlling the first to fourth auxiliary switching devices S1 to S4, respectively; and con_S5 and con_S6 are control signals controlling the first and second charge transfer switching devices S5 and S6 of FIG. 1, respectively.

Referring to FIGS. 1 and 3, operations of the bridge circuit are described as follows.

As mentioned above, when the bridge circuit operates as the rectifier, the first bridge node NB1 and the second bridge node NB2 of FIG. 1 function as input nodes, and the common node NC of FIG. 1 functions as an output node.

Thus, the first current I1 of FIG. 1, which is input to the first bridge node NB1 of FIG. 1, is provided as an input current.

When a voltage of the first bridge node NB1 is lower than a voltage of the second bridge node NB2, for example, a magnitude of the first current I1 is greater than 0, the second control signal con_Q2 and the third control signal con_Q3 are at a high level, and the first control signal con_Q1 and the fourth control signal con_Q4 are at a low level. For example, when the magnitude of the first current I1 is greater than 0, the second switching device Q2 and the third switching device Q3 are in a turned on state, and the first switching device Q1 and the fourth switching device Q4 are in a turned off state.

When the voltage of the first bridge node NB1 is higher than a voltage of the second bridge node NB2, for example, the magnitude of the first current I1 is less than 0, the second control signal con_Q2 and the third control signal con_Q3 are at a low level, and the first control signal con_Q1 and the fourth control signal con_Q4 are at a high level. For example, when the magnitude of the first current I1 is less than 0, the second switching device Q2 and the third switching device Q3 are in a turned off state, and the first switching device Q1 and the fourth switching device Q4 are in a turned on state.

A first charge recycling control signal con_S5 and a second charge recycling control signal con_S6 are at a high level for a predetermined period of time prior to an operation of turning on the first switching device Q1 and the fourth switching device Q4 and turning off the second switching device Q2 and the third switching device Q3, for example, in a charge recycling period P_CR. In the charge recycling period P_CR, the first to fourth auxiliary control signals con_S1 to con_S4 are at a low level.

When the first charge recycling control signal con_S5 and the second charge recycling control signal con_S6 are at a high level, the first charge transfer switching device S5 and the second charge transfer switching device S6 are turned on in the charge recycling period P_CR. Thus, in the charge recycling period P_CR, charges accumulated in parasitic capacitors of the second switching device Q2 being turned on are transferred to parasitic capacitors of the fourth switching device Q4 being turned off, and charges accumulated in parasitic capacitors of the third switching device Q3 being turned on are transferred to parasitic capacitors of the first switching device Q1 being turned off.

In a driving period P_D, the first charge recycling control signal con_S5 and the second charge recycling control signal con_S6 are at a low level.

In the driving period P_D, the first to fourth auxiliary control signals con_S1 to con_S4 are also at a high level. Thus, the first to fourth control signals con_Q1 to con_Q4 are applied to the gates of the first to fourth switching devices Q1 to Q4, respectively. As a result, the first switching device Q1 and the fourth switching device Q4 are turned on, and the second switching device Q2 and the third switching device Q3 are turned off. When the first switching device Q1 and the fourth switching device Q4 are turned on, a certain amount of charges have already been accumulated in the parasitic capacitors of each of the first to fourth switching devices Q1 to Q4. Thus, power supplied by the driver to turn on the first switching device Q1 and the fourth switching device Q4 is reduced by an amount corresponding to an amount of charges accumulated in the parasitic capacitors of each of the first switching device Q1 and the fourth switching device Q4.

At the end of the driving period P_D, the first charge recycling control signal con_S5 and the second charge recycling control signal con_S6 are at a high level iteratively, and the first charge transfer switching device S5 and the second charge transfer switching device S6 are turned on. Thus, charges, accumulated in the parasitic capacitors of the first switching device Q1 being turned on are transferred to the parasitic capacitors of the third switching device Q3 being turned off, and charges, accumulated in the parasitic capacitors of the fourth switching device Q4 being turned on, are transferred to the parasitic capacitors of the second switching device Q2 being turned off.

For example, at least a portion of energy accumulated in the parasitic capacitors of each of the second switching device Q2 and the third switching device Q3 in order to turn on the second switching device Q2 and the third switching device Q3 is used to turn on the first switching device Q1 and the fourth switching device Q4, thus reducing switching loss.

Although FIG. 3 illustrates the first to fourth control signals con_Q1 to con_Q4 maintained in previous states thereof in the charge recycling period P_CR, all of the first to fourth control signals con_Q1 to con_Q4 may also be at a low level in the charge recycling period P_CR.

Figure 4:
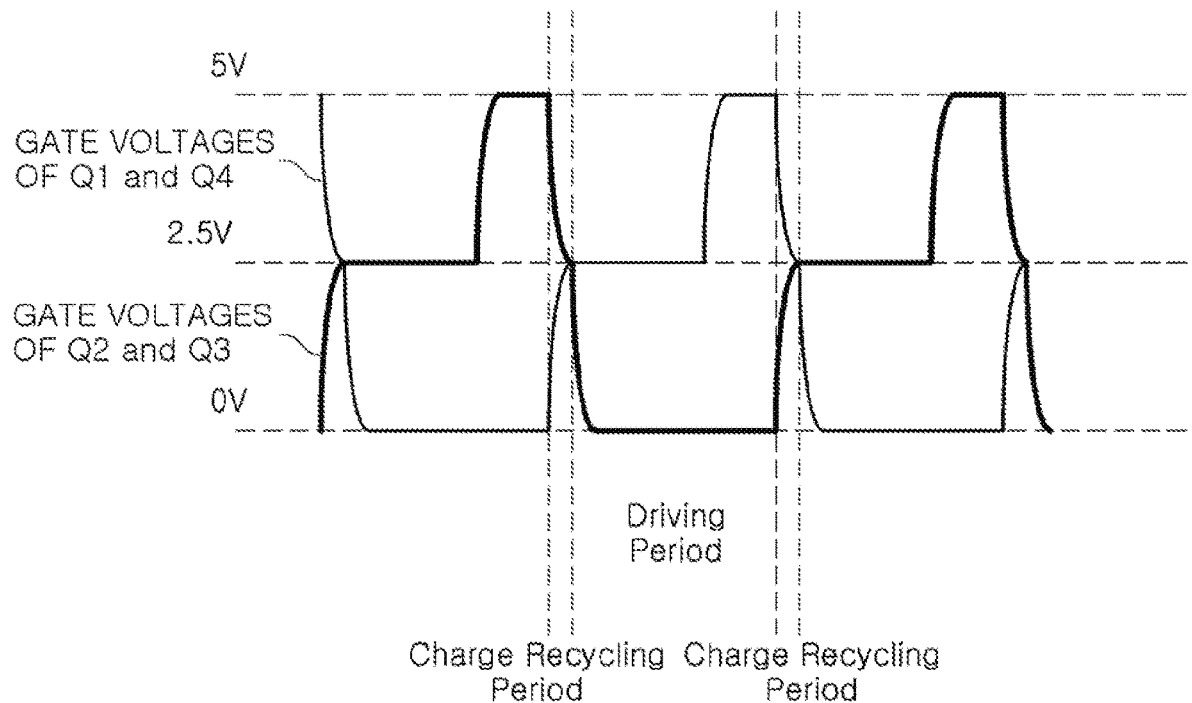
FIG. 4 is a schematic diagram illustrating gate voltages of switching devices of a bridge circuit, according to an example.

FIG. 4 is a schematic diagram illustrating gate voltages of switching devices of a bridge circuit, according to an example, and illustrates a case in which the first to fourth control signals con_Q1 to con_Q4 controlling the first to fourth switching devices Q1 to Q4 of FIG. 1, respectively, vary between 0V and 5V.

As illustrated in FIG. 4, the first charge transfer switching device S5 or the second charge transfer switching device S6 of FIG. 1 is turned on during a charge recycling period, and charge sharing occurs between parasitic capacitors of each of the switching devices Q1 to Q4, which are alternately turned on and off. As a result, a gate voltage of each of the first to fourth switching devices Q1 to Q4 of FIG. 1 may be about 2.5V.

In a driving period, a gate voltage of the switching devices Q1 and Q4 to be turned on rises to 5V, and a gate voltage of the switching devices Q2 and Q3 to be turned off drops to 0V.

For example, charge sharing allows energy accumulated in parasitic capacitors of switching devices to be turned off to be reused to turn on a switching device. As a result, an amount of current consumed to generate a gate voltage required to turn on the switching device may be reduced to 50%, compared to a case in which an auxiliary switching device is absent.

Figure 5:
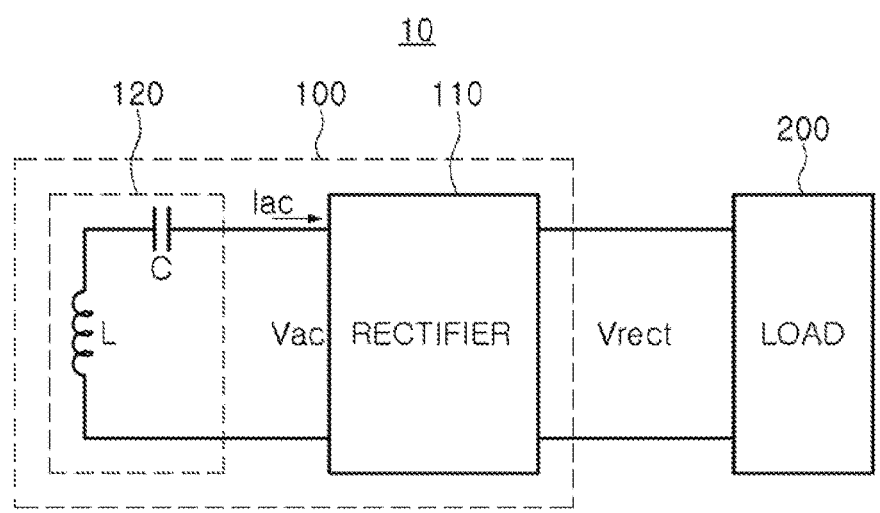
FIG. 5 is a schematic diagram illustrating a device including a bridge circuit, according to an example.

FIG. 5 is a schematic diagram illustrating a device 10 including a bridge circuit, according to an example. The device 10 includes a wireless power reception device 100 and a load 200. The wireless power reception device 100 includes a rectifier 110, including the bridge circuit, and a power reception resonator 120.

The wireless power reception device 100 receives power wirelessly transmitted from a wireless power transmission device (not illustrated), and outputs a rectified voltage Vrect.

The power reception resonator 120 includes a power reception coil L and a power reception capacitor C connected to each other in series, receives power wirelessly transmitted from the wireless power transmission device (not illustrated), and outputs an AC voltage Vac.

The rectifier 110 includes the bridge circuit (not illustrated) and a controller (not illustrated), rectifies the AC voltage Vac, and outputs the rectified voltage Vrect.

The load 200 is a battery that receives the rectified voltage Vrect and stores power, or an electronic module that performs a predetermined function.

FIG. 5 illustrates an example of the wireless power reception device 100 including the rectifier 110, and the device 10 including the power reception device 100, but the concept of the present disclosure may be applied to various types of devices including a rectifier or an inverter.

Figure 6:
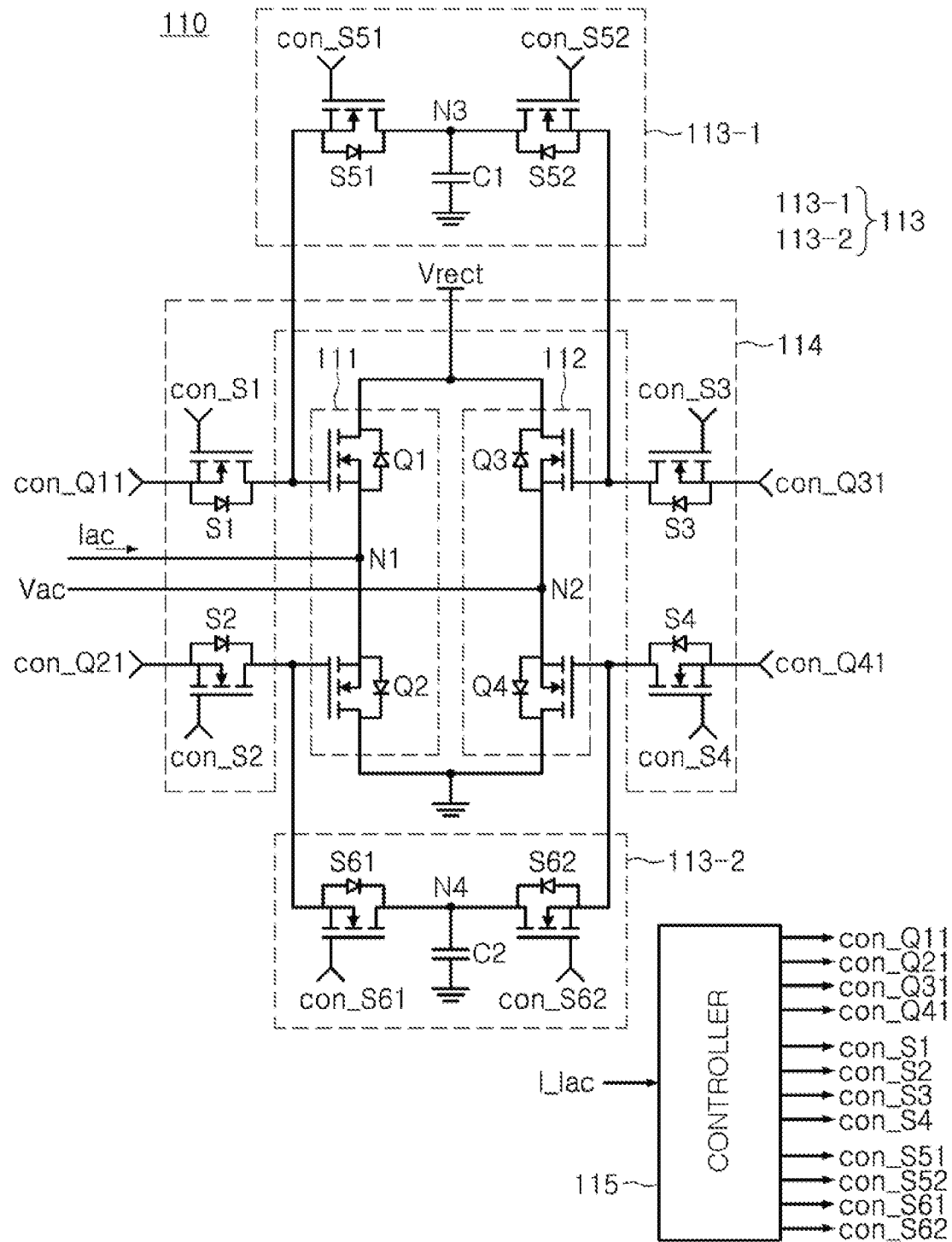
FIG. 6 is a schematic circuit diagram illustrating a rectifier including a bridge circuit, according to an example.

FIG. 6 is a schematic circuit diagram illustrating the rectifier 110, according to an example. The rectifier 110 includes a first leg 111, a second leg 112, a first charge recycler 113-1, a second charge recycler 113-2, an auxiliary switch group 114, and a controller 115.

The first leg 111 and the second leg 112 form a full bridge circuit, which converts the AC voltage Vac to the rectified voltage Vrect and outputs the rectified voltage Vrect. The first leg 111 includes a first switching device Q1 connected between a terminal for outputting the rectified voltage Vrect and a first node N1, and a second switching device Q2 connected between the first node N1 and a ground. The second leg 112 includes a third switching device Q3 connected between the terminal for outputting the rectified voltage Vrect and a second node N2, and a fourth switching device Q4 connected between the second node N2 and the ground. The first switching device Q1 and the fourth switching device Q4 are turned on or off simultaneously, and the second switching device Q2 and the third switching device Q3 are turned on or off simultaneously. The second switching device Q2 is turned on when a current starts to flow from a ground node to the first node N1, and is turned off when a magnitude of the current is 0. The fourth switching device Q4 is turned on when a current starts to flow from the ground node to the second node N2, and is turned off when the magnitude of the current is 0. The AC voltage Vac is input to the first node N1 and the second node N2.

The first charge recycler 113-1 transfers charges stored by parasitic capacitance components of the first switching device Q1 to a gate terminal of the third switching device Q3, or transfers charges stored by parasitic capacitance components of the third switching device Q3 to a gate terminal of the first switching device Q1. The second charge recycler 113-2 transfers charges stored by parasitic capacitance components of the second switching device Q2 to a gate terminal of the fourth switching device Q4, or transfers charges stored by parasitic capacitance components of the fourth switching device Q4 to a gate terminal of the second switching device Q2.

The first charge recycler 113-1 includes a first charge transfer switching device (e.g., transistor) S51 connected between a gate of the first switching device Q1 and a third node N3, a third charge transfer switching device (e.g., transistor) S52 connected between the third node N3 and a gate of the third switching device Q3, and a first capacitor C1 connected between the third node N3 and the ground. The second charge recycler 113-2 includes a second charge transfer switching device (e.g., transistor) S61 connected between a gate of the second switching device Q1 and a fourth node N4, a fourth charge transfer switching device (e.g., transistor) S62 connected between the fourth node N4 and a gate of the fourth switching device Q4, and a second capacitor C2 connected between the fourth node N4 and the ground.

The auxiliary switch group 114 transmits a first delayed control signal con_Q11, a second delayed control signal con_Q21, a third delayed control signal con_Q31, and a fourth delayed control signal con_Q41 to the first switching device Q1, the second switching device Q2, the third switching device Q3, and the fourth switching device Q4, respectively. The auxiliary switch group 114 includes a first auxiliary switching device S1 connected between a terminal for receiving the first delayed control signal con_Q11 and the gate of the first switching device Q1, a second auxiliary switching device S2 connected between a terminal for receiving the second delayed control signal con_Q21 and the gate of the second switching device Q2, a third auxiliary switching device S3 connected between a terminal for receiving the third delayed control signal con_Q31 and the gate of the third switching device Q3, and a fourth auxiliary switching device S4 connected between a terminal for receiving the fourth delayed control signal con_Q41 and the gate of the fourth switching device Q4.

The controller 115 outputs the first to fourth delayed control signals con_Q11 to con_Q41, first to fourth auxiliary switch control signals con_S1 to con_S4 controlling the first to fourth auxiliary switching devices S1 to S4 of the auxiliary switch group 114, and first and third charge recycling control signals con_S51 and con_S52 and second and fourth charge recycling control signals con_S61 and con_S62 controlling the first and third charge transfer switching devices S51 and S52 of the first charge recycler 113-1 and the second and fourth charge transfer switching devices S61 and S62 of the second charge recycler 113-2, respectively. The controller 115 outputs the above-mentioned control signals in response to information about an AC current Iac, for example, current information I_Iac, which is information about a current flowing through the first leg 111 or the second leg 112.

Figure 7:
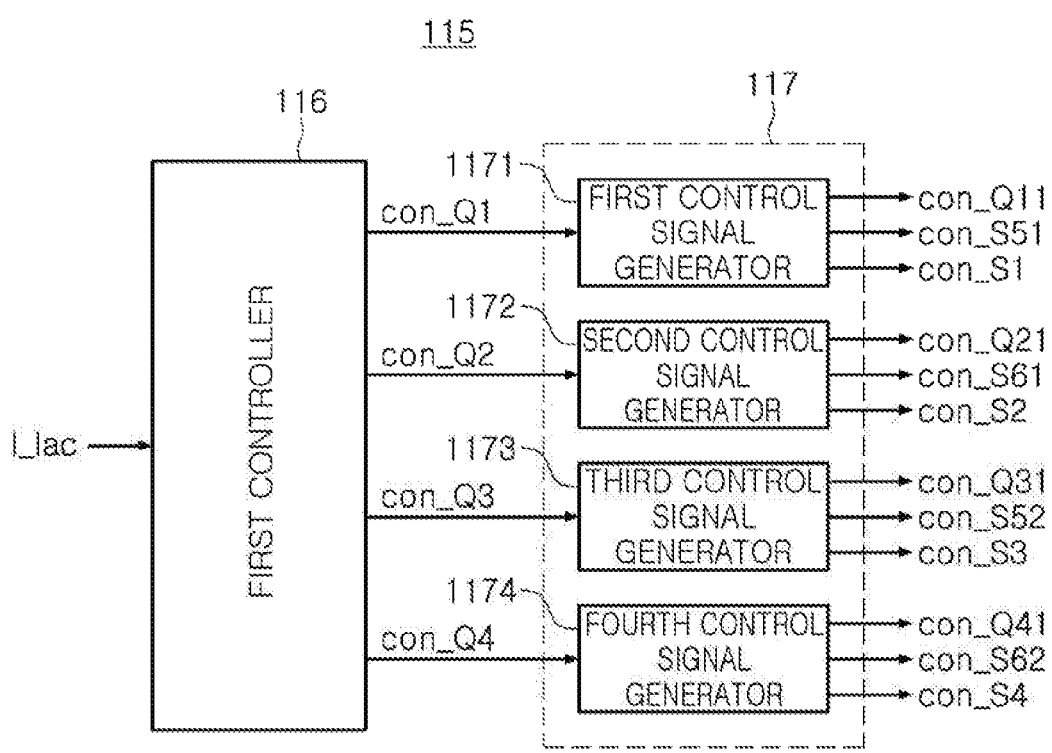
FIG. 7 is a schematic diagram illustrating an example of a controller of the rectifier illustrated in FIG. 6.

FIG. 7 is a schematic diagram illustrating an example of the controller 115 of the rectifier 110 illustrated in FIG. 6, according to an example. The controller 115 includes a first controller 116 and a second controller 117. The second controller 117 includes a first control signal generator 1171, a second control signal generator 1172, a third control signal generator 1173, and a fourth control signal generator 1174.

The first controller 116 outputs the first control signal con_Q1, the second control signal con_Q2, the third control signal con_Q3, and the fourth control signal con_Q4 in response to the current information I_Iac. For example, the first controller 116 changes values of the first control signal con_Q1, the second control signal con_Q2, the third control signal con_Q3, and the fourth control signal con_Q4 at a time at which an absolute value of the AC current Iac of FIG. 6 is greater than 0 and at a time at which a magnitude of the AC current Iac of FIG. 6 is 0, in response to the current information I_Iac.

The second controller 117 outputs the first to fourth delayed control signals con_Q11 to con_Q41, the first to fourth auxiliary switch control signals con_S1 to con_S4, and the first to fourth charge recycling control signals con_S51, con_S61, con_S52, and con_S62 in response to the first control signal con_Q1, the second control signal con_Q2, the third control signal con_Q3, and the fourth control signal con_Q4.

The first control signal generator 1171 outputs the first delayed control signal con_Q11, the first charge recycling control signal con_S51, and the first auxiliary switch control signal con_S1, in response to the first control signal con_Q1. The second control signal generator 1172 outputs the second delayed control signal con_Q21, the second charge recycling control signal con_S61, and the second auxiliary switch control signal con_S2, in response to the second control signal con_Q2. The third control signal generator 1173 outputs the third delayed control signal con_Q31, the third charge recycling control signal con_S52, and the third auxiliary switch control signal con_S3, in response to the third control signal con_Q3. The fourth control signal generator 1174 outputs the fourth delayed control signal con_Q41, the fourth charge recycling control signal con_S62, and the fourth auxiliary switch control signal con_S4, in response to the fourth control signal con_Q4.

Each of the first to fourth control signal generators 1171 to 1174 delays an input control signal to generate a delayed control signal, and also generates pulses based on the input control signal and outputs the generated pulses as a charge recycling control signal and an auxiliary switch control signal, respectively.

Figure 8:
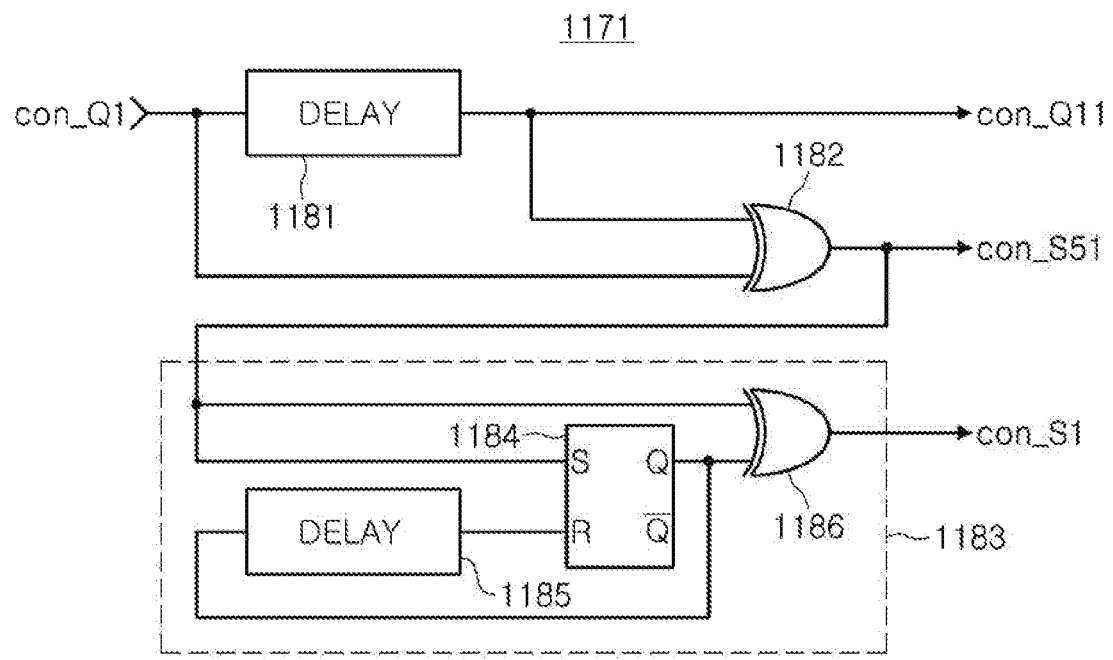
FIG. 8 is a schematic diagram illustrating an example of a first control signal generator of the controller illustrated in FIG. 7.

FIG. 8 is a schematic diagram illustrating an example of the first control signal generator 1171 illustrated in FIG. 7. The first control signal generator 1171 includes, for example, a first delay 1181, a first charge recycling control signal generator 1182, and a first auxiliary switch control signal generator 1183. The first auxiliary switch control signal generator 1183 includes a latch 1184, a second delay 1185, and an exclusive OR (XOR) gate 1186.

The first delay 1181 delays the first control signal con_Q1 by a first delay time to output the first delayed control signal con_Q11. The first delay time is determined according to total capacitance measured from the gate of the first switching device Q1 and on-resistance of the first charge transfer switching device S51.

The first charge recycling control signal generator 1182 outputs the first charge recycling control signal con_S51 in response to the first control signal con_Q1 and/or the first delayed control signal con_Q11. A state of the first charge recycling control signal con_S51 changes from a low level to a high level at a time at which a state of the first control signal con_Q1 changes from a low level to a high level, and is a pulse signal whose pulse width is the first delay time. For example, the first charge recycling control signal generator 1182 includes an XOR gate that receives the first control signal con_Q1 and the first delayed control signal con_Q11 so as to output the first charge recycling control signal con_S51.

The first auxiliary switch control signal generator 1183 outputs the first auxiliary switch control signal con_S1 in response to the first charge recycling control signal con_S51. A state of the first auxiliary switch control signal con_S1 changes from a low level to a high level, at a time at which a state of the first charge recycling control signal con_S51 changes from a low level to a high level, and is a pulse signal whose pulse width is a second delay time. The second delay time is determined according to total capacitance measured from the gate of the first switching device Q1 and on-resistance of the first auxiliary switching device S1.

The latch 1184 changes a state of a signal, output from an output Q terminal, to a high level when a signal having a high level is input to a set S terminal, and changes a state of a signal, output from the output Q terminal, to a low level when a signal having a high level is input to a reset R terminal. The first charge recycling control signal con_S51 is input to the set S terminal of the latch 1184, and an output signal of the second delay 1185 is input to the reset R terminal. The second delay 1185 delays a signal, output from the output Q terminal of the latch 1184, by the sum of the first delay time and the second delay time, and outputs the delayed signal. For example, the latch 1184 or the second delay 1185 generates a pulse signal of which a stage change from a low level to a high level at a time at which a state of the first charge recycling control signal con_S51 changes from a low level to a high level, and pulse width is the sum of the first delay time and the second delay time. The XOR gate 1186 receives the first charge recycling control signal con_S51, and the signal output from the output Q terminal of the latch 1184 to output the first auxiliary switch control signal con_S1.

Although not illustrated, each of the second control signal generator 1172, the third control signal generator 1173, and the fourth control signal generator 1174 has the same structure as that of the first control signal generator 1171 illustrated in FIG. 8. For example, when a signal input to the circuit illustrated in FIG. 8 is the second control signal con_Q2, a signal output from the circuit is the second delayed control signal con_Q21, the second charge recycling control signal con_S61, and the second auxiliary switch control signal con_S2; when a signal input to the circuit is the third control signal con_Q3, a signal output from the circuit is the third delayed control signal con_Q31, the third charge recycling control signal con_S52, and the third auxiliary switch control signal con_S3; and when a signal input to the circuit is the fourth control signal con_Q4, a signal output from the circuit is the fourth delayed control signal con_Q41, the fourth charge recycling control signal con_S62, and the fourth auxiliary switch control signal con_S4. Further, delay times of delays of each of the second control signal generator 1172, the third control signal generator 1173, and the fourth control signal generator 1174 may be determined to be similar to those of the first control signal generator 1171, according to physical properties of corresponding switching devices.

Figure 9:
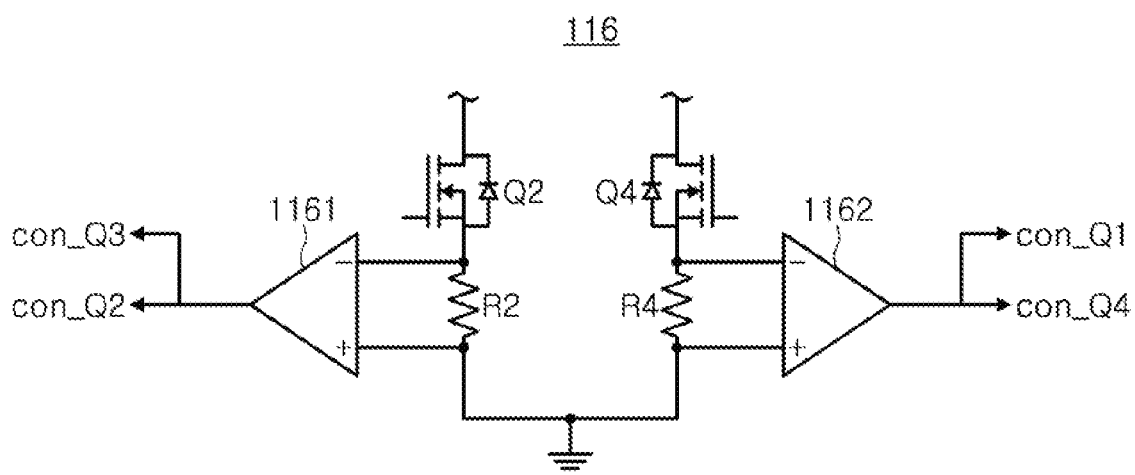
FIG. 9 is a schematic circuit diagram illustrating an example of a first controller of the controller illustrated in FIG. 7.

FIG. 9 is a schematic circuit diagram illustrating an example of the first controller 116 of the controller 115 illustrated in FIG. 7. The first controller 116 includes a first comparator 1161 and a second comparator 1162. As illustrated in FIG. 9, Q2 indicates the same device as the second switching device Q2 of FIG. 6, and Q4 indicates the same device as the fourth switching device Q4 of FIG. 6.

A second resistor R2 is connected between the second switching device Q2 and the ground, and a fourth resistor R4 is connected between the fourth switching device Q4 and the ground. A positive (+) input terminal of the first comparator 1161 is connected to a node between the second resistor R2 and the ground, and a negative (−) input terminal of the first comparator 1161 is connected to a node between the second resistor R2 and the second switching device Q2. A positive (+) input terminal of the second comparator 1162 is connected to a node between the fourth resistor R4 and the ground, and a negative (−) input terminal of the second comparator 1162 is connected to a node between the fourth resistor R4 and the fourth switching device Q4. An output signal of the first comparator 1161 is provided as the second control signal con_Q2 and the third control signal con_Q3, and an output signal of the second comparator 1162 is provided as the first control signal con_Q1 and the fourth control signal con_Q4.

For example, according to the example illustrated in FIG. 9, the first controller 116 receives a voltage across the second resistor R2 and a voltage across the fourth resistor R4 as the current information I_lac, and may outputs the first to fourth control signals con_Q1 to con_Q4 using the received voltages.

In addition to the example illustrated in FIG. 9, various types of controllers, implemented to control zero-current switching of the rectifier, may be used as the first controller.

Figure 10:
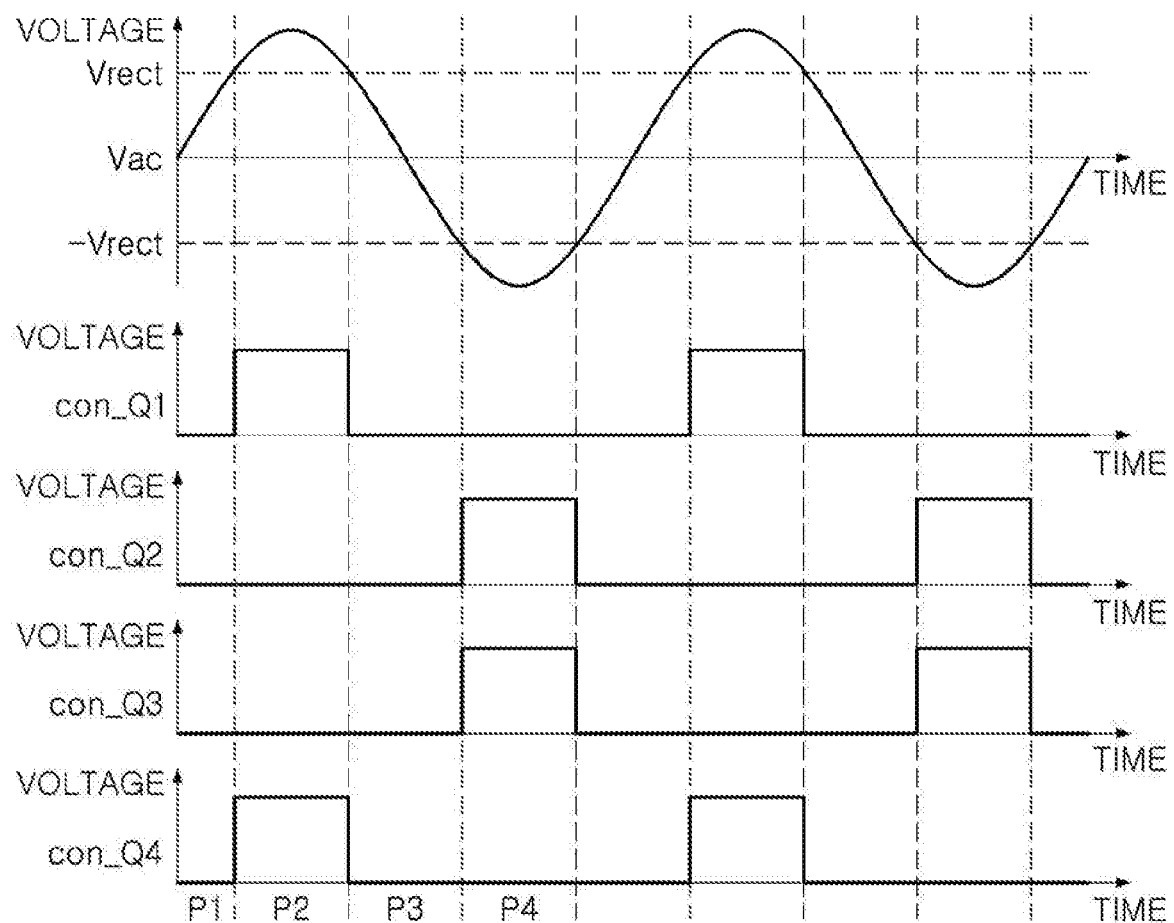
FIGS. 10 and 11 are schematic diagrams illustrating examples of control signals controlling respective switching devices of the rectifier illustrated in FIG. 6.
Figure 11:
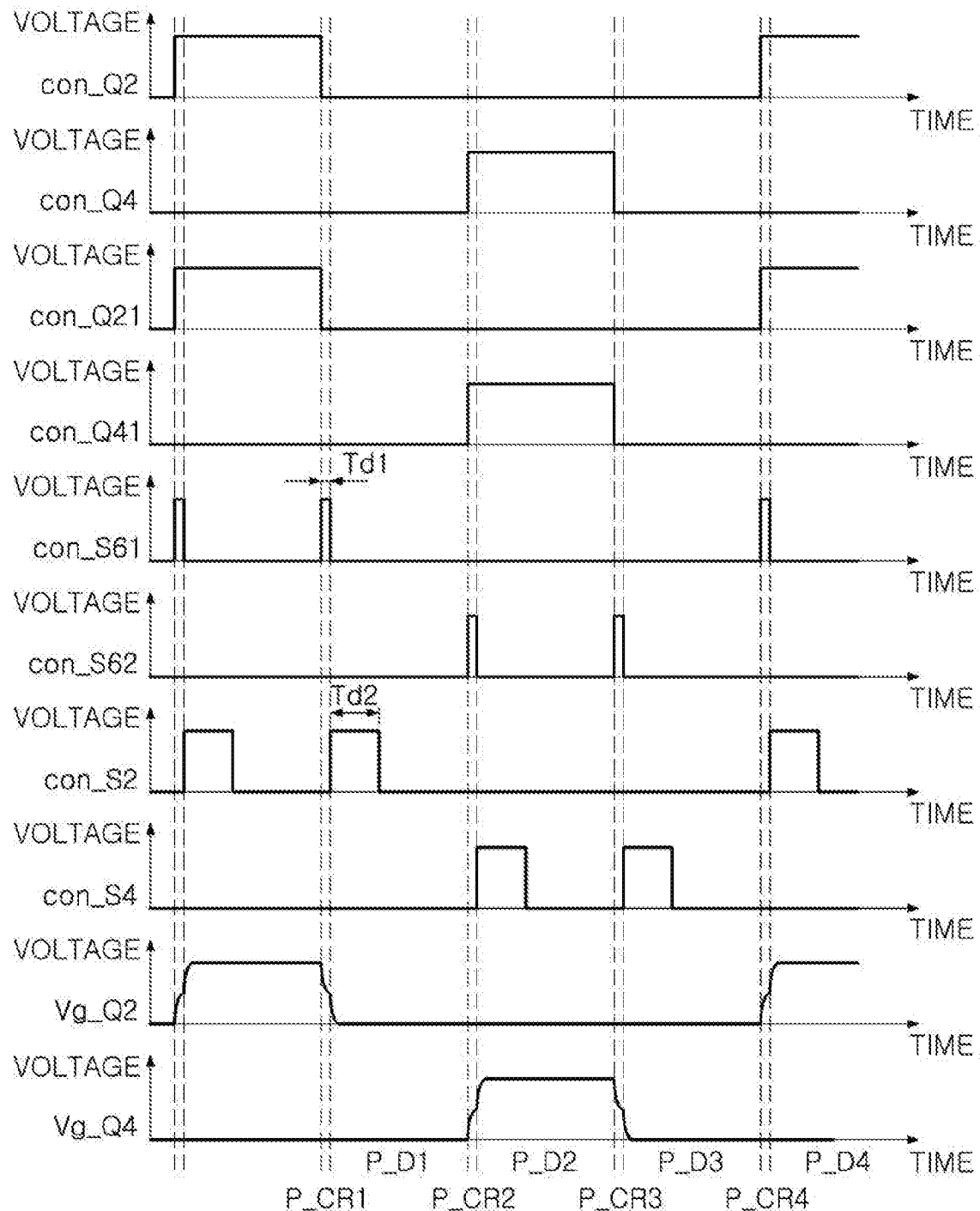

FIGS. 10 and 11 are diagrams illustrating examples of control signals controlling respective switching devices of the rectifier 110 illustrated in FIG. 6. As illustrated in FIGS. 10 and 11, Vac indicates an AC voltage input to the rectifier 110; Vrect indicates a rectified voltage output from the rectifier 110; con_Q1 indicates the first control signal con_Q1; con_Q2 indicates the second control signal con_Q2; con_Q3 indicates the third control signal con_Q3; con_Q4 indicates the fourth control signal con_Q4; con_Q21 indicates the second delayed control signal con_Q21; con_Q41 indicates the fourth delayed control signal con_Q41; con_Q61 indicates the second charge recycling control signal con_Q61; con_Q62 indicates the fourth charge recycling control signal con_Q62; con_S2 indicates the second auxiliary switch control signal con_S2; con_S4 indicates the fourth auxiliary switch control signal con_S4; Vg_Q2 indicates the gate voltage of the second switching device Q2; and Vg_Q4 indicates the gate voltage of the fourth switching device Q4.

First, the process of generating the first to fourth control signals con_Q1 to con_Q4 by the rectifier, according to an example, will be described with reference to FIGS. 6, 9, and 10 as follows.

In a period P2 in which the AC voltage Vac is higher than the rectified voltage Vrect, a voltage of the first node N1 is higher than a voltage of the terminal for outputting the rectified voltage Vrect. Thus, the current flows through a path via the terminal for outputting the rectified voltage Vrect, the load for receiving the rectified voltage Vrect, the ground, and the second node N2. The current flows through parasitic diodes of the first switching device Q1 and the fourth switching device Q4. Further, when the current flows as described above, a voltage at the positive (+) input terminal of the second comparator 1162 is higher than that of the negative (−) input terminal of the second comparator 1162. Thus, in the period P2, the first control signal con_Q1 and the fourth control signal con_Q4 are at high levels. Further, in the period P2, the current does not flow through the second resistor R2, and thus the second control signal con_Q2 and the third control signal con_Q3 are at low levels.

In a period P4 in which the AC voltage Vac is lower than a negative rectified voltage −Vrect, a voltage of the second node N2 is higher than that of the terminal for outputting the rectified voltage Vrect. Thus, the current flows through a path via the second node N2, the terminal for outputting the rectified voltage Vrect, the load for receiving the rectified voltage Vrect, the ground, and the first node N1. The current flows through parasitic diodes of the second switching device Q2 and the third switching device Q3. Further, when the current flows as described above, a voltage at the positive (+) input terminal of the first comparator 1161 is higher than that of the negative (−) input terminal of the first comparator 1161. Thus, in the period P4, the second control signal con_Q2 and the third control signal con_Q3 are at high levels. Further, in the period P4, the current does not flow through the fourth resistor R4, and thus the first control signal con_Q1 and the fourth control signal con_Q4 are at low levels.

In a period P1 or P3 in which an absolute value of the AC voltage Vac is less than that of the rectified voltage Vrect, the current does not flow through the second resistor R2 and the fourth resistor R4. Thus, the first to fourth control signals con_Q1 to con_Q4 are at low levels.

Subsequently, the process of generating the first to fourth delayed control signals con_Q11 to con_Q41, the first to fourth charge recycling control signals con_S51, con_S61, con_S52, and con_S62, and the first to fourth auxiliary switch control signals con_S1 to con_S4 by the rectifier, according to an example, will be described with reference to FIGS. 6, 7, 8, and 11 as follows.

First, the rectifier generates the second delayed control signal con_Q21 and the fourth delayed control signal con_Q41 in response to the second control signal con_Q2 and the fourth control signal con_Q4. For example, the rectifier generates the second delayed control signal con_Q21 and the fourth delayed control signal con_Q41 by delaying the second control signal con_Q2 and the fourth control signal con_Q4, respectively, by a first delay time Td1.

Subsequently, the rectifier generates the second charge recycling control signal con_S61 and the fourth charge recycling control signal con_S62 in response to the second control signal con_Q2, the fourth control signal con_Q4, the second delayed control signal con_Q21, and/or the fourth delayed control signal con_Q41. For example, the rectifier generates the second charge recycling control signal con_S61 by inputting the second control signal con_Q2 and the second delayed control signal con_Q21 to the XOR gate, and generates the fourth charge recycling control signal con_S62 by inputting the fourth control signal con_Q4 and the fourth delayed control signal con_Q41 to the XOR gate. Thus, as illustrated in FIG. 11, a state of the second charge recycling control signal con_S61 changes from a low level to a high level at a time at which a state of the second control signal con_Q2 changes, for example, at a time at which the AC voltage Vac is lower than the negative rectified voltage −Vrect and at a time at which the AC voltage Vac is higher than the negative rectified voltage −Vrect, and the second charge recycling control signal con_S61 is a pulse signal whose width is the first delay time Td1; and a. A state of the fourth charge recycling control signal con_S62 changes from a low level to a high level at a time at which a state of the fourth control signal con_Q4 changes, for example, at a time at which the AC voltage Vac is higher than the rectified voltage Vrect and at a time at which the AC voltage Vac is lower than the rectified voltage Vrect, and the fourth charge recycling control signal con_S62 is a pulse signal whose width is the first delay time Td1.

Subsequently, the rectifier generates the second auxiliary switch control signal con_S2 and the fourth auxiliary switch control signal con_S4 in response to the second charge recycling control signal con_S61 and/or the fourth charge recycling control signal con_S62. For example, the rectifier generates the second auxiliary switch control signal con_S2 by inputting the second charge recycling control signal con_S61 to a second auxiliary switch control signal generator, having the same configuration as that of the first auxiliary switch control signal generator 1183 of FIG. 8, and generates the fourth auxiliary switch control signal con_S4 by inputting the fourth charge recycling control signal con_S62 to a fourth auxiliary switch control signal generator, having the same configuration as that of the first auxiliary switch control signal generator 1183 of FIG. 8. Thus, as illustrated in FIG. 11, a state of the second auxiliary switch control signal con_S2 changes from a low level to a high level at a time at which a state of the second charge recycling control signal con_S61 changes from a high level to a low level, for example, at a time at which the first delay time Td1 has elapsed from a time at which the AC voltage Vac is lower than the negative rectified voltage −Vrect, and the second auxiliary switch control signal con_S2 is a pulse signal whose width is a second delay time Td2. A state of the fourth auxiliary switch control signal con_S4 changes from a low level to a high level at a time at which a state of the fourth charge recycling control signal con_S62 changes from a high level to a low level, for example, at a time at which the first delay time Td1 has elapsed from a time at which the AC voltage Vac is higher than the rectified voltage Vrect, and the fourth auxiliary switch control signal con_S4 is a pulse signal whose width is the second delay time Td2.

The process of generating the first delayed control signal con_Q11, the third delayed control signal con_Q31, the first charge recycling control signal con_S51, the third charge recycling control signal con_S52, the first auxiliary switch control signal con_S1, and the third auxiliary switch control signal con_S3, is similar to the process of generating the second delayed control signal con_Q21, the fourth delayed control signal con_Q41, the second charge recycling control signal con_S61, the fourth charge recycling control signal con_S62, the second auxiliary switch control signal con_S2, and the fourth auxiliary switch control signal con_S4.

Hereinafter, referring to FIGS. 6 and 11, example operations of the rectifier 110 will be described as follows.

In a first charge recycling period P_CR1, the second charge transfer switching device S61 is turned on, and the second auxiliary switching device S2 is turned off. Thus, at least a portion of charges stored by the parasitic capacitance components of the second switching device Q2 is stored in the second capacitor C2. As a result, the gate voltage of the second switching device Q2 is reduced. The gate voltage of the second switching device Q2 is reduced, for example, to about 50% of a gate driving voltage. In the first charge recycling period P_CR1, the fourth charge transfer switching device S62 and the fourth auxiliary switching device S4 are in off states, and a voltage at the gate terminal of the fourth switching device Q4 is at a low level.

In a first driving period P_D1, the second charge transfer switching device S61 is turned off, and the second auxiliary switching device S2 is turned on. Further, in the first driving period P_D1, the second delayed control signal con_Q21 having a low level is applied to the gate terminal of the second switching device Q2. Thus, the gate voltage of the second switching device Q2 drops to a low level, and the second switching device Q2 is turned off. The second auxiliary switching device S2 is turned on for the second delay time Td2, and thus the second delayed control signal con_Q21 is applied to the gate terminal of the second switching device Q2 for the second delay time Td2. In the first driving period P_D1, the fourth charge transfer switching device S62 and the fourth auxiliary switching device S4 are in off states, and a voltage at the gate terminal of the fourth switching device Q4 is at a low level.

In a second charge recycling period P_CR2, the fourth charge transfer switching device S62 is turned on, and the fourth auxiliary switching device S4 is turned off. Thus, the charges stored in the second capacitor C2 are transferred to the gate terminal of the fourth switching device Q4. As a result, the gate voltage of the fourth switching device Q4 is increased. The gate voltage of the fourth switching device Q4 is increased, for example, to about 50% of the gate driving voltage. Further, the charges transferred from the second capacitor C2 are stored in the parasitic capacitors of the fourth switching device Q4. In the second charge recycling period P_CR2, the second charge transfer switching device S61 and the second auxiliary switching device S2 are in off states, and the voltage at the gate terminal of the second switching device Q2 is at a low level.

In a second driving period P_D2, the fourth charge transfer switching device S62 is turned off, and the fourth auxiliary switching device S4 is turned on. Further, in the second driving period P_D2, the fourth delayed control signal con_Q41 having a high level is applied to the gate terminal of the fourth switching device Q4. Thus, the gate voltage of the fourth switching device Q4 reaches the gate driving voltage, and the fourth switching device Q4 is turned on. The fourth auxiliary switching device S4 is turned on for the second delay time Td2, and thus the fourth delayed control signal con_Q41 is applied to the gate terminal of the fourth switching device Q4 for the second delay time Td2. In the second driving period P_D2, the second charge transfer switching device S61 and the second auxiliary switching device S2 are in off states, and the voltage at the gate terminal of the second switching device Q2 is at a low level.

In a third charge recycling period P_CR3, the fourth charge transfer switching device S62 is turned on, and the fourth auxiliary switching device S4 is turned off. Thus, charges stored by the parasitic capacitance components of the fourth switching device Q4 are stored in the second capacitor C2. As a result, the gate voltage of the fourth switching device Q4 is reduced. The gate voltage of the fourth switching device Q4 is reduced, for example, to about 50% of the gate driving voltage. In the third charge recycling period P_CR3, the second charge transfer switching device S61 and the second auxiliary switching device S2 are in off states, and the voltage at the gate terminal of the second switching device Q2 is at a low level.

In a third driving period P_D3, the fourth charge transfer switching device S62 is turned off, and the fourth auxiliary switching device S4 is turned on. Further, in the third driving period P_D3, the fourth delayed control signal con_Q41 having a low level is applied to the gate terminal of the fourth switching device Q4. Thus, the gate voltage of the fourth switching device Q4 drops to a low level, and the fourth switching device Q4 is turned off. The fourth auxiliary switching device S4 is turned on for the second delay time Td2, and thus the fourth delayed control signal con_Q41 is applied to the gate terminal of the fourth switching device Q4 for the second delay time Td2. In the third driving period P_D3, the second charge transfer switching device S61 and the second auxiliary switching device S2 are in off states, and the voltage at the gate terminal of the second switching device Q2 is at a low level.

In a fourth charge recycling period P_CR4, the second charge transfer switching device S61 is turned on, and the second auxiliary switching device S2 is turned off. Thus, the charges, stored in the second capacitor C2, are moved to the gate terminal of the second switching device Q2. As a result, the gate voltage of the second switching device Q2 may be increased. The gate voltage of the second switching device Q2 reaches about 50% of the gate driving voltage. Further, the charges, moved from the second capacitor C2, are stored in the parasitic capacitors of the second switching device Q2. In the fourth charge recycling period P_CR4, the fourth charge transfer switching device S62 and the fourth auxiliary switching device S4 are in off states, and the voltage at the gate terminal of the fourth switching device Q4 is at a low level.

In a fourth driving period P_D4, the second charge transfer switching device S61 is turned off, and the second auxiliary switching device S2 is turned on. Further, in the fourth driving period P_D4, the second delayed control signal con_Q21 having a high level is applied to the gate terminal of the second switching device Q2. Thus, the gate voltage of the second switching device Q2 reaches the gate driving voltage, and the second switching device Q2 is turned on. The second auxiliary switching device S2 is turned on for the second delay time Td2, and thus the second delayed control signal con_Q21 is applied to the gate terminal of the second switching device Q2 for the second delay time Td2. In the fourth driving period P_D4, the fourth charge transfer switching device S62 and the fourth auxiliary switching device S4 are in off states, and the voltage at the gate terminal of the fourth switching device Q4 is at a low level.

As mentioned above, the pulse widths of the second charge recycling control signal con_S61 and the fourth charge recycling control signal con_S62 correspond to the first delay time Td1, and a length of the first charge recycling period P_CR1 corresponds to the same time as the first delay time Td1. Further, the first delay time Td1 is determined according to total capacitance measured from the gate of the second switching device Q2 or the fourth switching device Q4 and on-resistance of the second charge transfer switching device S61. For example, the first delay time Td1 is equal to or greater than a first value obtained by multiplying, by 2.2, a value obtained by multiplying the total capacitance measured from the gate of the second switching device Q2 or the fourth switching device Q4 by the on-resistance of the second charge transfer switching device S61, and is equal to or less than a second value obtained by multiplying the obtained value by 4. When the first delay time Td1 is equal to or greater than the first value, an amount of charges sufficient to reduce power consumption of the charges stored by the parasitic capacitance components of the second switching device Q2 or the fourth switching device Q4 are transferred to the gate terminal of the second switching device Q2 or the fourth switching device Q4 through the second capacitor C2. Further, when the first delay time Td1 is equal to or less than the second value, the overall operations of the rectifier are performed more smoothly.

Further, pulse widths of the second auxiliary switch control signal con_S2 and the fourth auxiliary switch control signal con_S4 correspond to the second delay time Td2, which is a turn-on time of the second auxiliary switching device S2 and the fourth auxiliary switching device S4. The second delay time Td2 is determined according to total capacitance measured from the gate of the second switching device Q2 or the fourth switching device Q4 and on-resistance of the second auxiliary switching device S2 or the fourth auxiliary switching device S4. For example, the second delay time Td2 is equal to or greater than a first value obtained by multiplying, by 2.2, a value obtained by multiplying the total capacitance measured from the gate of the second switching device Q2 or the fourth switching device Q4 by the on-resistance of the second auxiliary switching device S2, and is equal to or less than a second value obtained by multiplying the obtained value by 4. Further, the second delay time Td2 may be about 50 times the first delay time Td1. As described above, the determining of the second delay time Td2 may significantly reduce power consumption, and may also secure an amount of time sufficient to drive the second switching device Q2 or the fourth switching device Q4.

The pulse width of the fourth charge recycling control signal con_S62 is different from the pulse width of the second charge recycling control signal con_S61. For example, the pulse width of the fourth charge recycling control signal con_S62 is determined by a method similar to the method of determining the above-mentioned first delay time Td1, based on total capacitance measured from the gate of the fourth switching device Q4 and on-resistance of the fourth charge transfer switching device S62. Further, the pulse width of the fourth auxiliary switch control signal con_S4 is different from the pulse width of the second auxiliary switch control signal con_S2. For example, the pulse width of the fourth auxiliary switch control signal con_S4 is determined by a method similar to the method of determining the above-mentioned second delay time Td2, based on total capacitance measured from the gate of the fourth switching device Q4 and on-resistance of the fourth auxiliary switching device S4.

The operations of the first switching device Q1, the third switching device Q3, the first charge recycler 113-1, the first auxiliary switching device S1, and the third auxiliary switching device S3 are similar to those of the second switching device Q2, the fourth switching device Q4, the second charge recycler 113-2, the second auxiliary switching device S2, and the fourth auxiliary switching device S4, respectively, described above.

As set forth above, according to the examples, a bridge circuit and a rectifier including the same reduce power consumption that occurs during a switching operation.

The controller 115, the first controller 116, the second controller 117, the first control signal generator 1171, the second control signal generator 1172, the third control signal generator 1173, and the fourth control signal generator 1174 in FIGS. 6 and 7 that perform the operations described in this application are implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A bridge circuit, comprising:
   a first leg comprising a first switching device and a second switching device connected between a first node and a ground;
   a second leg comprising a third switching device and a fourth switching device connected between the first node and the ground; and
   a first charge recycler connected between a gate of the first switching device and a gate of the third switching device, and configured to transfer charges accumulated in the first switching device to the gate of the third switching device prior to turning on the third switching device,
   wherein the first switching device and the third switching device are high-side switching devices, or the first switching device and the third switching device are low-side switching devices, and
   wherein the first charge recycler comprises
      a first charge transfer switching device connected between the gate of the first switching device and a third node,
      a second charge transfer switching device connected between the gate of the third switching device the third node, and
      a capacitor connected between the third node and the ground.

2. The bridge circuit of claim 1, further comprising:
   a second charge recycler connected between a gate of the second switching device and a gate of the fourth switching device, and configured to transfer charges accumulated in the second switching device to the gate of the fourth switching device prior to turning on the fourth switching device.

3. A rectifier, comprising:
   a bridge circuit comprising
      a first leg comprising a first switching device and a second switching device connected between an output node for outputting a rectified voltage and a ground,
      a second leg comprising a third switching device and a fourth switching device connected between the output node and the ground, and
      a first charge recycler connected between a gate of the first switching device and a gate of the third switching device, and configured to transfer charges accumulated in the first switching device to the gate of the third switching device prior to turning on the third switching device; and
   a controller configured to control the first switching device, the second switching device, the third switching device, the fourth switching device, and the first charge recycler,
   wherein the first switching device and the third switching device are high-side switching devices, or the first switching device and the third switching device are low-side switching devices,
   wherein the first switching device is connected between the output node and a first node, wherein the second switching device is connected between the first node and the ground, wherein the third switching device is connected between the output node and a second node, wherein the fourth switching device is connected between the second node and the ground, and wherein the first charge recycler comprises
 a first charge transfer switching device connected between the gate of the first switching device and a third node,
 a first capacitor connected between the third node an the ground, and
 a third charge transfer switching device connected the third node and the gate of the third switching device.

4. The rectifier of claim 3, wherein
an alternating current (AC) voltage is input to the first node and the second node, and
the rectifier further comprises a second charge recycler connected between a gate of the second switching device and a gate of the fourth switching device, and configured to transfer charges accumulated in the second switching device to the gate of the fourth switching device prior to turning on the fourth switching device.

5. The rectifier of claim 4, wherein the second charge recycler comprises
 a second charge transfer switching device connected between the gate of the second switching device and a fourth node,
 a second capacitor connected between the fourth node and the ground, and
 a fourth charge transfer switching device connected between the fourth node and the gate of the fourth switching device.

6. The rectifier of claim 5, wherein the controller is configured to control the second switching device, the third switching device, the second charge transfer switching device, and the third charge transfer switching device, based on a first current flowing to the first node, and to control the first switching device, the fourth switching device, the first charge transfer switching device, and the fourth charge transfer switching device, based on a second current flowing to the second node.

7. The rectifier of claim 6, wherein the controller comprises
 a first controller configured to output a second control signal and a third control signal, based on a determination of whether a magnitude of the first current is 0 or higher, and to output a first control signal and a fourth control signal, based on a determination of whether a magnitude of the second current is 0 or higher,
 a first control signal generator configured to output a first charge recycling control signal controlling the first charge transfer switching device in response to the first control signal,
 a second control signal generator configured to output a second charge recycling control signal controlling the second charge transfer switching device in response to the second control signal,
 a third control signal generator configured to output a third charge recycling control signal controlling the third charge transfer switching device in response to the third control signal, and
 a fourth control signal generator configured to output a fourth charge recycling control signal controlling the fourth charge transfer switching device in response to the fourth control signal.

8. The rectifier of claim 7, wherein the first control signal generator comprises
 a first delay configured to delay the first control signal so as to output a first delayed control signal, and
 a first gate device configured to receive the first control signal and the first delayed control signal so as to output the first charge recycling control signal.

9. The rectifier of claim 8, further comprising:
an auxiliary switching device connected between the first delay and the first switching device,
wherein the first control signal generator comprises
 a latch configured to receive the first charge recycling control signal from a set input terminal,
 a second delay configured to delay an output signal of the latch so as to output the delayed output signal to a reset input terminal of the latch, and
 a second gate device configured to receive the first charge recycling control signal and the output signal of the latch so as to output an auxiliary switch control signal controlling the auxiliary switching device.

10. The rectifier of claim 6, wherein the controller is configured to turn the second charge transfer switching device on for a first period of time from either one of a time at which a magnitude of the first current is determined to be higher than 0 and a time at which the magnitude of the first current is 0, and to turn the fourth charge transfer switching devices on for a second period of time from either one of a time at which a magnitude of the second current is higher than 0 and a time at which the magnitude of the second current is 0.

11. The rectifier of claim 10, wherein
the first period of time is greater than or equal to a value obtained by multiplying a value, obtained by multiplying total capacitance, measured from the gate of the second switching device, by on-resistance of the second charge transfer switching device, by 2.2, and
the second period of time is greater than or equal to a value obtained by multiplying a value, obtained by multiplying total capacitance, measured from the gate of the fourth switching device, by on-resistance of the fourth charge transfer switching device, by 2.2.

12. The rectifier of claim 6, wherein
the controller is further configured to output a second delayed control signal obtained by delaying a second control signal, being in a first state, for the first period of time while a magnitude of the first current is 0 or higher, and to output a fourth delayed control signal obtained by delaying a fourth control signal, being in the first state, for the second period of time while a magnitude of the second current is 0 or higher, and
the rectifier further comprises
 a second auxiliary switching device configured to transmit the second delayed control signal to the gate of the second switching device, and
 a fourth auxiliary switching device configured to transmit the fourth delayed control signal to the gate of the fourth switching device.

13. The rectifier of claim 12, wherein the controller is configured to turn the second auxiliary switching device on for a third period of time after turning off the second charge transfer switching device, and to turn the fourth auxiliary switching device on for a fourth period of time after turning off the fourth charge transfer switching device.

14. The rectifier of claim 13, wherein
the third period of time is greater than or equal to a value obtained by multiplying a value, obtained by multiplying total capacitance, measured from the gate of the second switching device, by on-resistance of the second auxiliary switching device, by 2.2, and the fourth period of time is greater than or equal to a value obtained by multiplying a value, obtained by multiplying total capacitance, measured from the gate of the fourth switching device, by on-resistance of the fourth auxiliary switching device, by 2.2.

15. A rectifier, comprising:

a bridge circuit configured to receive an alternating current (AC) input voltage and output a rectified voltage, and comprising a first switching transistor and a fourth switching transistor configured to be turned on or off together based on the AC input voltage, a second switching transistor and a third switching transistor configured to be turned on or off together based on the AC input voltage, a first charge recycler configured to transfer charges accumulated in the first switching transistor from a gate of the first switching transistor to a gate of the third switching transistor prior to turning on the third switching transistor, and a second charge recycler configured to transfer charges accumulated in the second switching transistor to a gate of the fourth switching transistor prior to turning on the fourth switching transistor; and a controller configured to control the bridge circuit, wherein the first charge recycler comprise first and third charge transfer switching transistors connected between the gate of the first switching transistor and the gate of the third switching transistor, and a first capacitor connected to a ground and a node between the first and third charge transfer switching transistors, and wherein the second charge recycler comprises second and fourth charge transfer switching transistors connected between a gate of the second switching transistor and the gate of the fourth switching transistor, and a second capacitor connected between the ground and a node between the second and fourth charge transfer switching transistors.

16. The rectifier of claim 15, wherein the controller is further configured to control the second switching transistor, the third switching transistor, the second charge transfer switching transistor, and the third charge transfer switching transistor, based on a first current flowing to a node between the first switching transistor and the third switching transistor, and control the first switching transistor, the fourth switching transistor, the first charge transfer switching transistor, and the fourth charge transfer switching transistor, based on a second current flowing to a node between the second switching transistor and the fourth switching transistor.

17. The rectifier of claim 16, wherein the AC input voltage is input to the first node and the second node.

18. A bridge circuit, comprising:

a first leg comprising a first switching device and a second switching device connected between a first node and a ground;

a second leg comprising a third switching device and a fourth switching device connected between the first node and the ground; and a charge recycler connected between a gate of the first switching device and a gate of the third switching device, and configured to transfer charges accumulated in the first switching device to the gate of the third switching device prior to turning on the third switching device, wherein the charge recycler comprises a first charge transfer switching device connected between the gate of the first switching device and a third node, a second charge transfer switching device connected between the gate of the third switching device and the third node, and a capacitor connected between the third node and the ground.

* * * * *